UNITED STATES PATENT OFFICE.

LUDWIG GRABAU, OF HANOVER, PRUSSIA, GERMANY.

MANUFACTURE OF ALUMINIUM FLUORIDE.

SPECIFICATION forming part of Letters Patent No. 386,704, dated July 24, 1888.

Application filed June 28, 1887. Serial No. 242,789. (Specimens.) Patented in Belgium June 11, 1887, No. 77,789; in France June 11, 1887, No. 179,219; in England October 21, 1887, No. 14,356, and in Austria-Hungary December 2, 1887, No. 49,098 and No. 23,116.

*To all whom it may concern:*

Be it known that I, LUDWIG GRABAU, engineer, a subject of the King of Prussia, residing at 41 Schiffgraben, Hanover, Germany, have invented certain new and useful Improvements in the Manufacture of Fluorides of Aluminium, (for which I have obtained Letters Patent in Belgium, dated June 11, 1887, No. 77,789; in Austria-Hungary, dated December 2, 1887, Nos. 49,098 and 23,116; in France, dated June 11, 1887, No. 179,219, and in England, dated October 21, 1887, No. 14,356;) and I do hereby declare the following to be a full, clear, and exact description of the invention, such as will enable others skilled in the art to which it appertains to make and use the same.

This invention relates to the separation of the aluminium fluoride from cryolite ($Al_2Fl_6$ $6NaF$) and to the simultaneous conversion into aluminium fluoride of the alkali fluoride combined with the aluminium fluoride; and it consists in the process substantially as hereinafter described, and set forth in the claim.

In the production of aluminium from aluminium fluoride by means of a metal of the alkalies the proportions are so chosen that the by-product obtained besides the aluminium will have the composition of cryolite. The use of this cryolite by-product is of great advantage in the manufacture or production of aluminium from aluminium fluoride, in that the aluminium fluoride is isolated or separated therefrom and the sodium fluoride of the cryolite is at the same time converted into aluminium fluoride. So far as I am aware, no practical process has been known before my invention whereby this end is attained.

According to my invention, the separation or isolation of the aluminium fluoride and the simultaneous conversion of the alkali fluoride in the cryolite into aluminium fluoride are effected by means of sulphate of alumina. The latter may be employed as such or in combination as alum or sulphate of aluminium fluoride, and essentially by the following two methods:

First. A solution of sulphate of aluminium will be equal in volume to the aluminium sulphate free from water contained in the solution. The conversion or reaction will take place according to the following formula: $Al_2(SO_4)_3 + [Al_2Fl_6, 6(NaFl)] = 2(Al_2Fl_6) + 3(Na_2SO_4).$ The cryolite enters already into partial solution at a normal temperature, and is completely dissolved when the solution is heated, such impurities as silicic acid, &c., if present, remaining insoluble. The clear solution is then evaporated, leaving a residue containing aluminium fluoride and alkali sulphate, which is heated to a red heat or ignited, and the alkali sulphate finally removed by washing in water.

Second. To effect a saving of cryolite—that is to say, in order to obtain a maximum quantity of aluminium fluoride from a minimum quantity of cryolite—the sulphate of aluminium solution may first be treated with fluor-spar in order to convert the major portion of the aluminium sulphate into a fluoride. To this end I employ a solution which contains about ten per centum of aluminium sulphate, $Al_2(SO_4)_3$, and it is immaterial whether the solution contains aluminium sulphate only or a solution containing both the sulphate and a salt of the alkalies. This solution is treated with an equivalent volume of pulverized fluor-spar and heated to about 90° centigrade, the conversion or reaction taking place according to the following formula: $Al_2(SO_4)_3 + 3(CaFl_2) = Al_2Fl_4, SO_4 + 2(CaSO_4) + CaFl_2.$ According to the duration of the action of the pulverized fluor-spar, the temperature applied, the quantity used, and the composition thereof, from two-thirds to three-fourths of the volume of aluminium sulphate is converted into aluminium fluoride. The solution of sulphate of aluminium fluoride so obtained is then freed from the gypsum produced during the reaction and from the undecomposed fluor-spar by filtration and compression.

In order to convert the remainder of the aluminium sulphate into aluminium fluoride, the solution of sulphate of aluminium fluoride or alum is treated with natural or artificial cryolite in such proportions that the cryolite is treated with cryolite, the reaction taking place according to the following formula:

$$3\begin{pmatrix}Fl_2\\AlFl_2\\SO_4\end{pmatrix} + [Al_2Fl_6, 6(NaFl)] = 4(Al_2Fl_6) + 3(Na_2SO_4)$$

From this solution the aluminium fluoride is obtained substantially as above described—namely, by evaporation, heating to redness or ignition of the product, and washing out of the alkali sulphate.

Having described my invention, what I claim is—

The process of producing aluminium fluoride which consists in treating a solution of aluminium sulphate such as described with sodium or potassium cryolite, evaporating the solution, heating the product to redness, and finally washing the same, substantially as described.

In testimony whereof I affix my signature in presence of two witnesses.

LUDWIG GRABAU.

Witnesses:
 E. PHILIPPOTHAL,
 JOH. KRACKE.